United States Patent
De Langis

[15] 3,659,152
[45] Apr. 25, 1972

[54] GROUND DETECTOR AND GUARD CIRCUIT

[72] Inventor: Philip A. De Langis, 4060 226th Street, Torrance, Calif. 90505

[22] Filed: Dec. 28, 1970

[21] Appl. No.: 101,684

[52] U.S. Cl. .................................. 317/18 B, 340/255
[51] Int. Cl. ........................................... H02h 3/14
[58] Field of Search ............... 324/51; 317/18 B; 340/255; 307/92, 140

[56] References Cited

UNITED STATES PATENTS

| | | | |
|---|---|---|---|
| 3,287,603 | 11/1966 | Sosnoski | 340/255 X |
| 3,320,480 | 5/1967 | Failor | 317/18 D |
| 3,386,004 | 5/1968 | Dwyer | 340/255 X |
| 3,407,336 | 10/1968 | Embree | 340/255 X |
| 3,426,342 | 2/1969 | De Langis | 317/18 B |

*Primary Examiner*—James D. Trammell
*Attorney*—Herman L. Gordon

[57] ABSTRACT

A ground detection and guard circuit for preventing operation of an appliance or instrument unless the associated supply source has a grounded conductor. The circuit includes a ground wire and a pair of line conductors, with a control relay having one terminal connected to the ground wire and respective neon lamps connected between the line conductors and its other terminal. If one of the line conductors is properly grounded, one of the neon lamps is shorted, allowing the other neon lamp to ignite and energize the control relay.

6 Claims, 1 Drawing Figure

Patented April 25, 1972
3,659,152
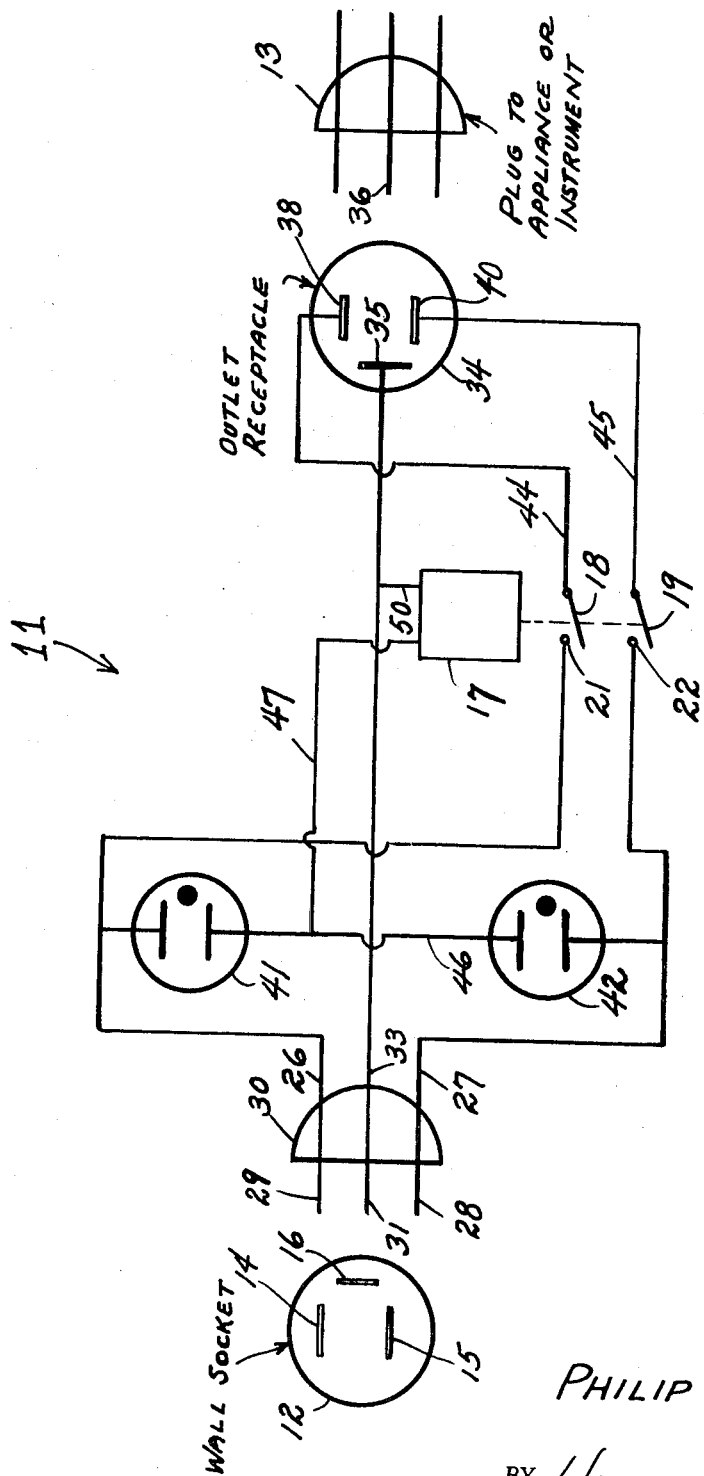
INVENTOR
PHILIP A. DeLANGIS
BY Herman L. Gordon
ATTORNEY

GROUND DETECTOR AND GUARD CIRCUIT

This invention relates to electrical safety devices, and more particularly to attachments or circuits for ascertaining the presence of a proper ground in supply conductors for energizing instruments or appliances and for preventing energization of such instruments or appliances unless a proper ground is present.

A main object of the invention is to provide a novel and improved ground detection and guard circuit which employs very simple components, which is reliable in operation and which is very inexpensive to construct.

A further object of the invention is to provide an improved supply line ground detection and guard circuit for appliances and instruments which gives a positive indication of a proper ground, when present, which prevents energization of an associated appliance or instrument when the supply line is not properly grounded, and which thereby greatly reduces electrical hazards in using the applicances and instruments.

A still further object of the invention is to provide an improved ground detection and guard circuit which employs a minimum number of parts so that it is very compact and can be easily employed where space is limited, which is very sensitive to the presence of a proper ground in the supply conductors with which it is used, and which may be employed either as a separate safety accessory or as an integral part of an appliance or instrument.

Further objects and advantages of the invention will become apparent from the following description and claims, and from the accompanying drawing, wherein the single Figure is a wiring diagram of an improved ground detector and guard device constructed in accordance with the present invention.

Referring to the drawing, 11 generally designates a typical ground detector and guard circuit device according to the present invention, adapted to be employed, for example, as an accessory connected between a wall socket 12 and the power supply plug 13 leading to an electrical instrument or appliance. The wall socket 12 is of the type having a pair of female line outlet terminals 14 and 15 and a female ground terminal 16, which should be connected to one of the line outlet terminals 14 or 15 in the installation. Thus, in the normal installation, one of the single phase supply lines leading to the terminals 14 and 15 is grounded. However, it frequently happens that the ground connection between terminal 16 and one of the line terminals 14 or 15 is absent, creating a dangerous condition for users of appliances or instruments plugged into the socket 12.

A prime purpose of the apparatus 11 is to detect the presence of the ground connection of socket 12 and to prevent energization of an appliance or instrument from said socket when the ground connection is not present.

The apparatus 11 comprises a relay 17 having a pair of poles 18 and 19. Said poles are engageable with respective stationary contacts 21 and 22 when the relay is energized. The apparatus includes a conventional three-prong plug 30 insertable in the wall socket 12 and a conventional outlet receptacle 34 in which the appliance or instrument plug 13 is insertable. The apparatus also includes a pair of conventional gas discharge lamps 41 and 42, such as neon lamps.

Plug 30 has prongs 29, 31 and 28 respectively conductively engageable with the female contacts 14, 16 and 15 of the wall socket 12. Outlet receptacle 34 has the female line terminals 38 and 40 and the female ground terminal 35. The female ground terminal is conductively engageable by the ground prong 36 of the load plug 13.

Ground prong 31 is connected by a wire 33 to female ground terminal 35 and to one terminal of the winding of relay 17 by a wire 50.

Line prong 29 is connected by a wire 26 to relay contact 21. The associated pole 18 is connected by a wire 44 to outlet receptacle female contact 38. Line prong 28 is connected by a wire 27 to relay contact 22. The associated pole 19 is connected by a wire 45 to outlet receptacle female contact 40.

Neon lamps 41 and 42 are connected in series across wires 26 and 27, and their common junction wire 46 is connected by a wire 47 to the remaining terminal of the winding of relay 17.

Thus, with plug 30 engaged in wall socket 12, if female terminal 16 is not connected to either female terminal 14 or female terminal 15, namely, if the supply system does not have a proper internal ground connection, wire 33 will be disconnected from the supply system, and neither of the neon lamps will ignite, showing the absence of a proper ground. Also, relay 17 will remain deenergized, leaving its contacts 18-21 and 19-22 open. Therefore, the instrument or appliance associated with plug 13 will not be energized when plug 13 is inserted in receptacle 34.

However, if there is a proper internal ground connection in the supply system, namely, if female ground terminal 16 is connected to either terminal 14 or 15 in the supply system, wire 38 will likewise be connected to one of the supply terminals. This will cause one of the neon lamps 41 or 42 to ignite, providing an indication of a proper ground, and simultaneously will cause relay 17, whose winding is in series therewith, to become energized. Contacts 18-21 and 19-22 will close, allowing the instrument or appliance to be energized.

For example, assume that female terminal 16 is connected to female terminal 15 by a proper internal ground connection in the supply system. When plug 30 is inserted in socket 12, wire 33 will become connected to wire 27. Neon lamp 41 will thereby be connected in series with the relay winding across supply line terminals 14 and 15 and will ignite, allowing energizing current to flow through the relay winding. Correspondingly, if terminal 14 is the grounded terminal, neon lamp 42 will ignite, similarly causing energization of relay 17.

Thus, the presence of a proper ground will be indicated clearly by the ignition of either lamp 41 or 42, and the closure of relay contacts 18-21 and 19-22 will allow energization of the instrument or appliance associated with the load plug 13.

It will be apparent that within the spirit of the present invention, the ground detector and guard circuit 11 may be incorporated in the input circuit of the instrument or appliance, between the plug 13 and its input terminals instead of being constructed as a separate accessory.

The relay 17 may be replaced with two silicon-controlled rectifiers.

While a specific embodiment of an improved ground detection and guard circuit has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A ground detector and guard circuit device comprising plug means engageable in a three-terminal current supply socket of the type having a female ground terminal intended to be internally connected to one of the socket current supply conductors, said plug means having a pair of line prongs and a ground prong, a pair of load conductors and a load ground conductor, relay means having normally open contacts, circuit means including said contacts connecting said line prongs to said load conductors, and respective gas-discharge lamps connected between said line prongs and said load ground conductor through said relay means, whereby one of said lamps will ignite when said plug means is engaged in a supply socket having its female ground terminal internally connected to one of its current supply terminals, providing an indication of a proper ground and causing said relay means to become energized and close said contacts.

2. The ground detector and guard circuit device of claim 1, and an outlet receptacle having load terminals connected respectively to said load conductors and having a ground terminal connected to said load ground conductor.

3. The ground detector and guard circuit device of claim 1, and wherein said relay means comprises a relay having its winding connected between said ground prong and a common junction of said gas-discharge lamps.

4. The ground detector and guard circuit device of claim 3, and wherein said relay has two sets of normally open contacts, said circuit means comprising respective connections between said line prongs and load conductors each including a set of said normally open contacts.

5. The ground detector and guard circuit device of claim 4, and wherein said gas-discharge lamps comprise neon lamps.

6. The ground detector and guard circuit device of claim 2, and wherein said outlet receptacle is of a type adapted to receive a plug of the same type as said plug means.

* * * * *